United States Patent [19]

Leon

[11] 4,298,507
[45] Nov. 3, 1981

[54] FLEXIBLE MARKING COMPOSITION FOR PENCILS

[76] Inventor: Roque O. L. Leon, Buenavista No. 46, Mexico 14, D. F., Mexico

[21] Appl. No.: 159,936

[22] Filed: Jun. 16, 1980

[30] Foreign Application Priority Data

Mar. 11, 1980 [MX] Mexico .................................. 181502

[51] Int. Cl.$^3$ ............................................. C09D 13/00
[52] U.S. Cl. .................................... 260/4 AR; 106/19; 260/23.3; 260/23.7 M
[58] Field of Search ............. 260/4 AR, 23.3, 23.7 M; 106/19

[56] References Cited

U.S. PATENT DOCUMENTS 2,380,126  7/1945  Sturm ................................. 260/23.3
4,017,451  4/1977  Ishida et al. .......................... 106/19

FOREIGN PATENT DOCUMENTS 2240601  3/1973  Fed. Rep. of Germany ........ 106/19
1300752  7/1962  France ............................ 106/19 R
 653414  5/1951  United Kingdom ............... 260/4 R

*Primary Examiner*—Ronald W. Griffin
*Attorney, Agent, or Firm*—Fulwider, Patton, Rieber, Lee & Utecht

[57] ABSTRACT

A flexible marking composition for a pencil. The composition comprises an elastomer, one or more plasticizers, a selected pigment, and a pigment carrier mixed together in specified proportion and vulcanized with a vulcanizing agent.

10 Claims, No Drawings

FLEXIBLE MARKING COMPOSITION FOR PENCILS

BACKGROUND OF THE INVENTION

This invention relates to marking compositions for use in writing implements such as pencils. More specifically, this invention relates to an improved flexible marking composition for use in a permanently flexible pencil.

There has existed in the prior art a need for a flexible marking composition for a pencil. Such a composition desirably would be extrudable into an elongated, thin rod-like shape for reception within a flexible pencil body formed from a suitable plastic or the like to provide a permanently flexible pencil. This flexible pencil would be advantageous in that the composition and the pencil body would resist breakage during use, while still providing a marking material which can be readily sharpened. Moreover, such a pencil would have particular novelty attraction in that the flexible pencil could be oriented by the user in virtually any geometric configuration.

Several attempts have been made in the prior art to produce a flexible marking composition for a pencil. These prior art compositions essentially have comprised a combination of a flexible elastomer material with a suitable pigment. However, in the prior art, these compositions have tended to harden or become brittle with age, or upon exposure to ambient temperature fluctuations, thereby reducing the necessary flexibility of the composition. In the prior art, this has resulted in flexible marking compositions for pencils which tend to break easily after a relatively short period of time.

The present invention overcomes the problems and disadvantages of the prior art by providing an improved flexible marking composition which does not lose its flexibility over time, and which is resistant to the effects of ambient temperature variations.

SUMMARY OF THE INVENTION

In accordance with the invention, a flexible marking composition comprises an elastomer such as a natural or synthetic rubber combined with one or more plasticizers such as cumarone resin. These ingredients are mixed with a substantial quantity of a selected pigment in grit form such as powdered graphite. A pigment carrier and desiccant such as a paste of calcium oxide and mineral oil is combined with the mixture to form a substantially homogeneous slurry. The slurry is then combined with an appropriate amount of sulfur and one or more vulcanization accelerators such as dimethyl dithiocarbamate. The total composition is extruded to form an elongated rod-shaped member, and is then vulcanized to consolidate the shape to form a flexible marking composition for a pencil.

In one preferred form of the invention, the following composition ingredients and proportions by weight are chosen to form a flexible marking composition having a black color. Relatively small pieces of a synthetic rubber such as GR-S synthetic rubber are mixed in an amount equaling approximately 17.5 percent with approximately 6.5 percent plasticizers such as mineral oil, stearic acid, or cumarone resin. These constituents are combined in a conventional roll mill in the presence of appropriate heat to soften the material and yield a substantially homogeneous slurry. Approximately 63 percent pigment and pigment carrier in the form of powdered graphite is mixed in together with about 10 percent of a paste comprising approximately seven parts calcium oxide and three parts mineral oil. The resultant slurry is combined with approximately 2 percent sulfur and approximately 1 percent of vulcanizing accelerators such as zinc oxide and dimethyl dithiocarbamate. This composition is homogeneously mixed, and is extruded through an extrusion die to form an elongated rod-shaped member. The rod-shaped member is then vulcanized in the presence of heat at from about 150 degrees centigrade to about 180 degrees centigrade for from about 10 to 15 minutes. The thus-vulcanized composition is cooled, and is cut to the appropriate length for reception into a flexible pencil body formed from a suitable thermo-setting plastic such as polyethylene or the like.

DETAILED DESCRIPTION OF THE PREFERRED EMBODIMENT

A flexible marking composition of this invention is formed generally by a combination in specified proportion of an elastomer with one or more plasticizers, a pigment, a pigment carrier, and a desiccant. A substantially homogeneous slurry comprising these ingredients is combined with a relatively small amount of a vulcanizing agent such as sulfur and appropriate accelerators for vulcanization. The composition is extruded to yield an elongated rod-shaped member which is then vulcanized in the presence of heat to form a flexible marking composition for reception into a flexible pencil body to form a permanently flexible pencil. The composition is sufficiently flexible to resist breakage in spite of substantial twisting or bending and the like of the composition, yet has sufficient rigidity of form for satisfactory engagement of a writing surface such as paper for marking thereon. Moreover, the composition is sufficiently rigid to withstand sharpening by conventional pencil sharpening means to form a substantial marking point.

The selected elastomer comprises any of a wide variety of vulcanizable or polymerizable natural rubbers, or alternately, synthetic rubber such as GR-S synthetic rubber and the like. The elastomer is prepared by rolling relatively small pieces of the rubber in a conventional roll mill in the presence of an appropriate amount of heat to soften the rubber to a soft slurry.

Once softened, the elastomer is combined together in specified proportion with one or more plasticizers. These plasticizers function to improve the flexibility of of the final composition, and to help absorb coloration pigment and a pigment carrier as will be described in more detail. A preferred plasticizer comprises a cumarone resin mixed together with stearic acid, mineral oil, petroleum-base grease, or the like. Alternately, if desired, the stearic acid and the mineral oil or grease can be substituted by a variety of suitable plasticizer ingredients depending upon the desired flexibility characteristics of the marking composition. Moreover, various other plasticizers such as calcium abietate or colophony can be substituted for the cumarone resin.

The elastomer and plasticizers are mixed with a pigment carrier and desiccant in the form of a paste comprising calcium oxide in powder form carried by a suitable paste carrier such as mineral oil. The resultant mixture comprises a slurry to which is added a substantial quantity of a suitable pigment in grit form having a grit size of about 200 mesh or less. For example, a powdered ceramic such as kaolin combined with a suitable pigment may be used for providing a colored marking composition, whereas powdered graphite or the like may be used for providing a writing implement composition having a black color as in a traditional pencil lead. Alternately, virtually any organic or inorganic pigment may be used.

The resultant slurry is combined with a vulcanizing agent such as powdered sulfur. This mixture is then combined with an activating vulcanizer such as zinc oxide, and an accelerator such as dimethyl dithiocarbamate. The resultant composition is then extruded through an appropriately-shaped extrusion die to provide an elongated rod-shaped flexible member. This rod-shaped flexible member in then vulcanized in an autoclave or the like to form the flexible marking composition of this invention having the desired coloration pigment. The vulcanized composition is cut to the desired length, and is received into a flexible pencil body formed from a suitable flexible plastic material such as a polyethylene or the like. The pencil thus has a flexible, sharpenable core comprising the marking composition of this invention, and is bendable to virtually any desired geometric configuration without breakage.

The following Table 1 sets forth the various constituents of the marking composition of this invention by percentage of total weight of the composition.

TABLE 1

|   | Preferred (Approximate) | Range |
|---|---|---|
| 1. Elastomer | 17.5% | 15–22% |
| 2. Plasticizer | 6.5% | 3–9% |
| 3. Pigment Carrier | 13% | balance |
| 4. Pigment | 50% | 45–65% |
| 5. Desiccant Paste | 10% | 8–12% |
| 6. Vulcanizing Agent | 2% | 1–5% |
| 7. Vulcanizing Aids | 1% | 1–3% |

Flexible marking compositions according to this invention have been formed as set forth in the following Example I. Again, the percentages listed are percentage by weight of the composition.

EXAMPLE 1

| 1. GR-S Synthetic Rubber | 17.5% |
|---|---|
| 2. Plasticizer, Stearic Acid | 0.5% |
| 3. Plasticizer, Cumarone Resin | 4% |
| 4. Plasticizer, Mineral Oil | 2% |
| 5. Sulfur, fine powder | 2% |
| 6. Activating Agent, Zinc Oxide, fine powder | 1% |
| 7. Accelerator, Dimethyl Dithiocarbamate, fine powder | 0.5% |
| 8. Pigment and carrier, Graphite, 200 mesh particles | 63% |
| 9. Dessicant, Calcium Oxide (seven parts) and mineral oil (three parts) | 10% |

The above ingredients were mixed together in the above-specified proportions, and then passed through an extrusion die to form an elongated rod-shaped member. This rod-shaped member was then vulcanized in the presence of heat for about 10 to 15 minutes at a temperature of from about 150 to about 180 degrees centigrade. The vulcanized composition exhibited sufficient flexibility for twisting and shaping to a variety of geometric configurations without breakage. However, the composition demonstrated sufficient rigidity for satisfactory marking upon a writing surface such as paper. Moreover, the composition was sufficiently rigid to satisfactorily withstand sharpening by conventional pencil sharpening apparatus.

The flexible writing composition formed according to the compositions of Example I provides a written line on paper substantially identical to that of a conventional graphite lead composition used in common pencils. Further, the composition was tested in the laboratory over a period of about one month without significant deterioration in the flexibility of the composition or the quality of writing therefrom. Moreover, the composition was subjected to laboratory temperature fluctuations in the range of from about zero degrees centigrade to about 60 degrees centigrade without significant deterioration in composition flexibility or writing quality.

Alternate flexible marking compositions of this invention were formed as illustrated by the following Example 2. Once again, the percentages designated are percentages by weight of the total composition.

EXAMPLE 2

| 1. GR-S Synthetic Rubber | 17.5% |
|---|---|
| 2. Plasticizer, Stearic Acid | 0.5% |
| 3. Plasticizer, Cumarone Resin | 4% |
| 4. Plasticizer, Mineral Oil | 2% |
| 5. Sulfur, fine powder | 2% |
| 6. Activating Agent, Zinc Oxide, fine powder | 1% |
| 7. Accelerator, Dimethyl Dithiocarbamate, fine powder | 0.5% |
| 8. Pigment and Carrier, pigmented Kaolin, 200 mesh particles | 63% |
| 9. Dessicant, Calcium Oxide (seven parts) and mineral oil (three parts) | 10% |

Once again, the composition of Example 2 in slurry form was passed through an extrusion die to yield an elongated rod-shaped member. This member was then subjected to the same vulcanizing compositions set forth with respect to Example 1 to form the flexible marking composition of this invention. With the composition of Example 2, however, the composition had a color red, blue, green, or the like depending upon the particular organic or inorganic pigment mixed with the powdered kaolin. Of course, the density of the pigment was a direct function of the quantity of pigment used in relation to the quantity of powdered kaolin. Accordingly, the specific proportional weight relationship between the kaolin and the selected pigment is not shown in Example 2. However, for proper marking quality of the resultant flexible composition, the percentage by weight of kaolin in the composition set forth in Example 2 should be at least about 50%.

The marking composition of Example 2 was subjected to laboratory fluctuations in temperature within the range of from about zero degrees centigrade to about 60 degrees centigrade. Moreover, pencils including the marking composition set forth in Example 2 were produced in various colors, and were tested in the laboratory for a period of about one month. These pencils did not show significant deterioration in writing quality or flexibility over this period of time.

A wide variety of modifications and improvements to the flexible marking composition for pencils set forth herein are believed to be possible within the skill of the art. For example, a wide variety of plasticizers and pigments can be used in the composition. The specific pigment governs the color of the composition and resultant line markings produced therefrom, whereas the particular plasticizer or combination of plasticizers dictates the overall flexibility of the composition and the smoothness of markings produced by the composition. Accordingly, no limitation on the invention is intended except as set forth in the appended claims.

I claim:

1. A flexible marking composition comprising a vulcanized slurry including by weight about 15–22% elastomer selected from the group consisting essentially of natural rubber and synthetic rubber, about 3–9% plasticizers selected to include at least in part cumarone resin, about 2% vulcanizing agent, about 45–65% pigment, about 1–3% vulcanizing activator and accelerator, and about 10% desiccant for sequestrating moisture from the slurry and for inhibiting gas generation during vulcanizing, and the balance pigment carrier.

2. The composition of claim 1 wherein said plasticizer comprises about 0.5% stearic acid, about 4% cumarone resin, and about 2% mineral oil.

3. The composition of claim 1 wherein said vulcanizing agent comprises sulfur.

4. The composition of claim 3 wherein said sulfur is provided in an amount equaling approximately 2% and wherein said activator and accelerator comprises about 1% zinc oxide, and about 0.5% dimethyl dithiocarbamate.

5. The composition of claim 1 wherein said desiccant comprises a paste of about seven parts calcium oxide and about three parts mineral oil.

6. The composition of claim 1 wherein said pigment and pigment carrier is provided in a total amount equaling about 63%, and is selected from the group consisting of powdered graphite, and a powdered ceramic including a selected coloration pigment, said powdered graphite and powdered ceramic having a maximum particle size of about 200 mesh.

7. The composition of claim 1 wherein said elastomer is selected from the group consisting essentially of natural rubber and GR-S synthetic rubber, said plasticizer comprises about 0.5% stearic acid, about 4% cumarone resin, and about 2% mineral oil, said vulcanizing agent comprises about 2% sulfur and said activator and accelerator comprise about 1% zinc oxide and about 0.5% dimethyl dithiocarbamate, said desiccant comprises a paste of about seven parts calcium oxide and three parts mineral oil, and said pigment is selected from the group consisting of powered graphite and a powdered ceramic including a selected coloration pigment.

8. A method of making a flexible marking composition, comprising:

forming a substantially homogenous slurry including by weight about 15–22% elastomer selected from the group consisting essentially of natural and synthetic rubbers, about 3–9% plasticizers selected to include at least in part cumarone resin, about 8–12% desiccant for sequestrating moisture from the slurry and for inhibiting gas generation during vulcanization, about 50% pigment, about 2% vulcanizing agent, about 1–3% vulcanizing activator and accelerator, and the balance pigment carrier;

extruding the slurry through an extrusion die to form an elongated flexible rod-shaped member; and vulcanizing the extruded member to form the flexible marking composition.

9. The method of claim 8 wherein said vulcanizing step comprises subjecting the slurry to an elevated temperature of from about 150 to about 180 degrees centigrade for about 10 to 15 minutes.

10. The method of claim 8 wherein said forming step comprises mixing together about 17.5% elastomer selected from the group consisting of natural rubber and GR-S synthetic rubber, the plasticizer selected to include at least about 4% cumarone resin, the vulcanizing agent selected to include about 2% sulfur and the activator and accelerator to include about 1% zinc oxide and about 0.5% dimethyl dithiocarbamate, the desiccant selected in the form of a paste of about seven parts calcium oxide and three parts mineral oil, and the pigment selected from the group consisting of a powdered graphite and a powdered ceramic including a selected coloration pigment and a maximum particle size of about 200 mesh.

* * * * *